Patented Feb. 28, 1939

2,148,544

UNITED STATES PATENT OFFICE 2,148,544

METHOD OF PLASTICIZING CHEESE AND PRODUCT

Charles Doering and W Kedzie Teller, Chicago, Ill., assignors to Henry H. Doering, Chicago, Ill.

No Drawing. Application February 3, 1936, Serial No. 62,138

12 Claims. (Cl. 99—117)

This invention relates to cheese plasticizing substances and the method of processing cheese therewith, but more particularly to nutritious emulsifiers utilized in the processing of cheese.

It contemplates more especially the provision of a new cheese plasticizing agent that is primarily a nutritious food substance rather than a chemical substance that have heretofore been largely, if not entirely, thought necessary for plasticizing or emulsifying cheese during the pasteurization thereof in the production of the so called "process cheese".

This processing consists in the subjection of cheese to heat of sufficiently high temperature to destroy undesirable bacteria, but not sufficiently high to disintegrate the cheese into its component elements of casein and olein. This treatment usually prescribes that the cheese is kept at a temperature from about 140° F. to 175° F. for a short duration of time during which the cheese is actively stirred. Another process prescribes the subjection of the cheese to a friction pressure reaction which develops heat of pasteurization incident to the frictional reaction on the casein constituent of the cheese. Irrespective of the method of processing, however, the desired resultant is the pasteurization of the cheese, greatly reducing its tendency to deteriorate and, further, to improve the texture, body, slicing qualities and appearance of the cheese.

In some cases different kinds of cheese are blended during the processing to impart improved flavor and more uniform and homogeneous texture as well as keeping qualities. Also, in the case of Camembert, Brick and other cheese of extremely soft consistency, it is advantageous to blend a firmer cheese with the soft cheese to obtain a cheese of firmer body which can be more effectively emulsified, packed, sliced and processed for marketing purposes.

In the processing of cheese by one process or another, the cheese is reduced to a plastic state approaching liquidity, and the fat constituent of the cheese has a tendency to become separated from the casein, thereby disintegrating the product and impairing the desired texture thereof in its normal state. This tendency has heretofore been overcome by constantly stirring the cheese and incorporating therein a small amount of an emulsifying salt of a chemical character. In this manner, a pasteurized cheese product is produced with uniform and homogeneous texture.

Chemicals have been commonly used as emulsifying agents for this purpose. Non-nutritious chemicals have largely, if not entirely, been heretofore regarded as only satisfactory for this purpose. It has long been known in scientific literature that alkaline substances are solvents for casein. Since the emulsification of cheese involves the plasticizing or rendering soluble the casein constituent of cheese so that the olein or fat thereof will be miscible therewith, any number of chemical substances have been known to give satisfactory results.

One object of the present invention is to provide a nutritious food substance to serve as cheese emulsifiers that render miscible the casein and olein constituents of cheese incident to pasteurization.

Another object is to provide a soya derivative in combination with a fat constituent for enabling the emulsification of cheese incident to the pasteurization thereof.

Still another object is to provide nutritious oil as a base for a cheese emulsifier that is effective incident to the pasteurization of cheese.

A further object is to provide a process of emulsifying and pasteurizing cheese by resort to a highly nutritive plasticizing composition.

A still further object is to provide an edible nutritious plasticizing substance for cheese that has an oil base of a non-chemical character.

Still a further object is to provide an edible nutritious substance for cheese that has an oil base intermixed with a soya derivative to constitute an emulsified constituent for cheese to effect the plasticizing thereof incident to the pasteurization of cheese.

An additional object is to provide an improved preformed emulsion that serves to prevent separation of the fat and water phases of cheese through the temperature range required to melt and effect the pasteurization thereof.

Other objects and advantages will appear from the following description of an illustrative embodiment of the present invention.

As stated, in the methods heretofore used for processing cheese some chemical expedient has usually been employed for changing the physical nature of the casein into a more soluble or plastic state. The reason for this change in state from the natural condition of the casein in young cheese was to make it more capable of emulsifying the fat constituent or olein with water in which the casein was dispersed to provide an emulsified pasteurized cheese having the desired moisture content within the limits prescribed by law.

The present invention specifically involves a new principle of emulsifying cheese to impart thereto the desired body, texture, homogeneity slicing quality, nutritive value and keeping qualities. It has been found that by creating a stable emulsion and intimately mixing that emulsion with finely ground natural cheese and subsequently subjecting the cheese and emulsion to a process which combines violent agitation with the application of sufficient heat to insure pasteurization, the product resulting after molding and cooling in preformed packages has a texture which enables it to be readily sliced, consumed and used in a most acceptable manner and form.

A preformed emulsion is prepared by adding to an emulsifying material such as soya bean flour a suitable amount of water and alkali and then by means of violent agitation incorporating a fatty material of the class consisting of edible fatty oils and fats such as butter, fat, cotton-seed, corn, peanut or other edible oils therein to provide a thorough and complete emulsion therewith. The proportions which have been found preferable though not absolutely essential, are as follows:

| | |
|---|---|
| Soya bean flour | lb 1 |
| Water | lb 1 |
| Corn oil | lbs 1½ |
| Caustic potash | oz 1 |

The flour is placed in a container and the caustic potash dissolved in water is added thereto in such manner that the flour is intimately mixed with the caustic potash to form a thin paste. The oil is then added in small amounts while the entire mixture is being violently agitated with a propeller or other suitable emulsifying device until the resultant product is a smooth, uniform emulsion similar in consistency to a salad dressing.

The above described emulsion is then added to one hundred pounds (100) of finely ground cheese together with sufficient water to adjust the moisture content to that permitted by law. These ingredients are thoroughly mixed for several minutes by agitating in a machine similar to a common dough mixer or other suitable device designed for that purpose. The resulting cheese product is then ready for final emulsification and pasteurization. This may then be accomplished either in the customary manner of heating and stirring in an open kettle at a temperature between 140 and 150° F. in the manner prescribed by the Kraft Reissue Patent 14,777 until such time as a smooth, homogeneous product results or by passing through a pasteurizing machine such as described in the Baumgartner et al. patent, numbered 1,997,032.

At such time as the product becomes plastic and uniform in consistency owing to the pasteurization thereof, it may be transferred into a preformed container so that after sealing and cooling it is ready for marketing and use. With the teachings of the present invention, it is possible to emulsify and pasteurize cheese and prepare it in a condition acceptable to the trade as government defined processed cheese without introducing materials which are not considered to be edible or non-foods in character. The resultant product contains no added materials which are not readily digestible and high in food value.

Various changes may be made in the embodiment of the invention herein specifically described without departing from or sacrificing any of the advantages of the invention as defined in the appended claims.

We claim:

1. A method of processing cheese which consists in adding to cheese a small amount of soya bean flour emulsified with an edible fatty material of the class consisting of edible fatty oils and fats, heating the mass to a temperature that is sufficiently high to effect pasteurization but not sufficiently high to disintegrate the cheese, and then packaging the cheese in containers for storage and marketing.

2. A method of processing cheese which consists in adding to cheese a small amount of soya bean flour emulsified with an edible corn oil, heating the mass to a temperature that is sufficiently high to effect pasteurization but not sufficiently high to disintegrate the cheese, and then packaging the cheese in containers for storage and marketing.

3. A method of processing cheese which consists in adding to cheese a small amount of soya bean flour, edible corn oil, and water in the form of an emulsified composition, heating the mass to a temperature that is sufficiently high to effect pasteurization but not sufficiently high to disintegrate the cheese, and then packaging the cheese in containers for storage and marketing.

4. A method of processing cheese which consists in adding to cheese a small amount of soya beam flour, an edible fatty material of the class consisting of fatty oils and fats, water and caustic potash in the form of an emulsified mass, heating the mass to a temperature that is sufficiently high to effect pasteurization but not sufficiently high to disintegrate the cheese, and then packaging the cheese in containers for storage and marketing.

5. A method of processing cheese which consists in adding to cheese a small amount of soya bean flour and edible fatty oil with water in the form of an emulsified composition, heating the mass to a temperature that is sufficiently high to effect pasteurization but not sufficiently high to disintegrate the cheese, and then packaging the cheese in containers for storage and marketing.

6. A product of manufacture comprising cheese plasticized with an emulsified mixture of soya bean flour and an edible fatty material of the class consisting of fatty oils and fats added thereto to provide an emulsified cheese product.

7. A product of manufacture comprising cheese plasticized with a soya bean flour intermixed with an edible fatty material of the class consisting of fatty oils and fats to provide an emulsified cheese product.

8. A product of manufacture comprising cheese plasticized with a soya bean flour intermixed with an edible fatty material of the class consisting of fatty oils and fats and water to provide an emulsified cheese product.

9. A product of manufacture comprising cheese plasticized with a soya bean flour intermixed with fatty edible materials of the class consisting of fatty oils and fats and water to provide an emulsified cheese product.

10. A product of manufacture comprising cheese plasticized with a soya bean flour intermixed with an edible fatty material of the class consisting of fatty oils and fats, caustic potash and water, to provide an emulsified cheese product.

11. A product of manufacture comprising cheese plasticized with a soya bean flour intermixed with an edible fatty oil and water to provide an emulsified cheese product.

12. A product of manufacture comprising cheese plasticized with a soya bean flour intermixed with fatty edible materials of the class consisting of fatty oils and fats and a small amount of caustic potash and water to provide an emulsified cheese product.

W KEDZIE TELLER.
CHARLES DOERING.